June 6, 1961 H. J. THIELSCH 2,987,022
COLLAPSIBLE BACK-UP RING
Filed Sept. 26, 1956 2 Sheets-Sheet 1
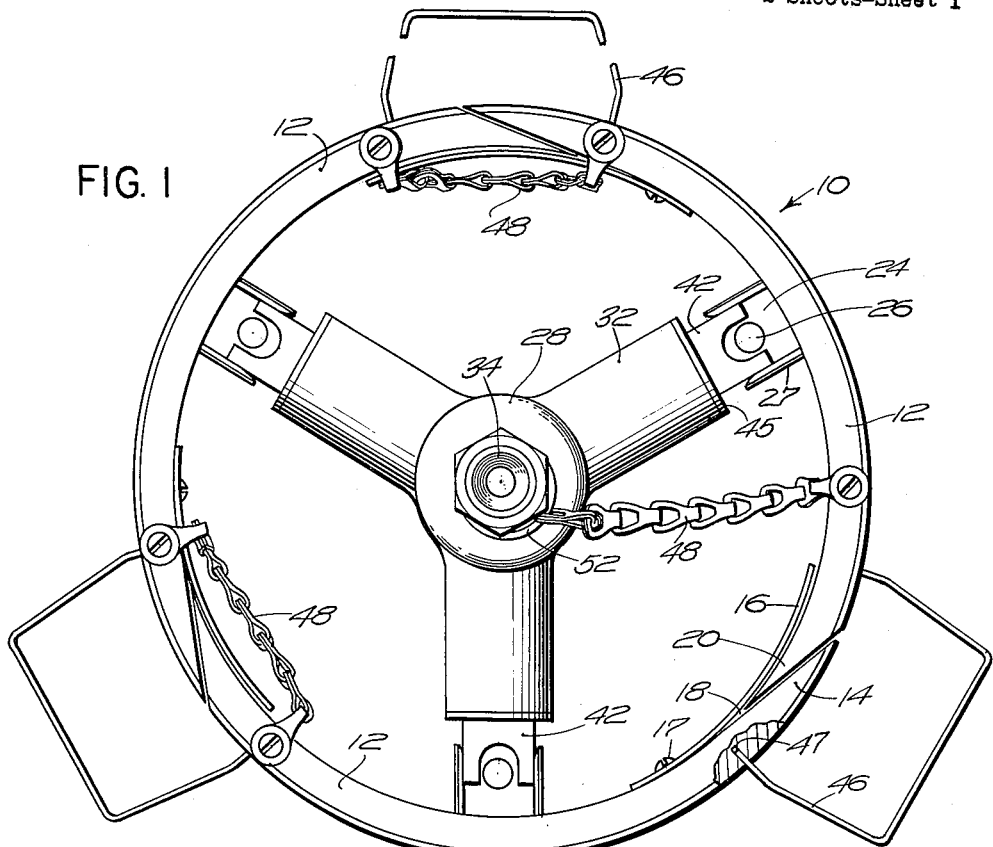
FIG. 1
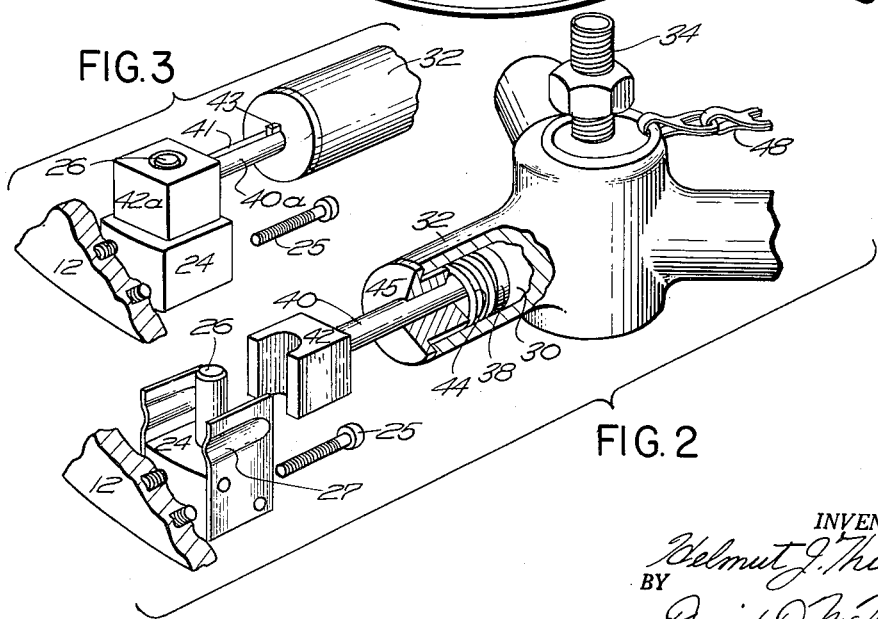
FIG. 3
FIG. 2
INVENTOR.
Helmut J. Thielich
BY
David D. McKenney
ATTORNEY June 6, 1961 H. J. THIELSCH 2,987,022
COLLAPSIBLE BACK-UP RING
Filed Sept. 26, 1956 2 Sheets-Sheet 2

INVENTOR.
Helmut J. Thielsch
BY
David D. McKenney
ATTORNEY

United States Patent Office 2,987,022
Patented June 6, 1961

2,987,022
COLLAPSIBLE BACK-UP RING
Helmut J. Thielsch, Providence, R.I., assignor to Grinnell Corporation, Providence, R.I., a corporation of Delaware
Filed Sept. 26, 1956, Ser. No. 612,271
6 Claims. (Cl. 113—103)

This invention relates to the welding of abutting ends of pipes and has particular utility in the fabrication of pipe joints in the field. More particularly, this invention relates to a collapsible back-up ring adapted to be located at the interior of the junction of two pipe sections to be welded together, the ring being collapsed and withdrawn after the completion of the welding process.

In the past the welding of pipe ends has sometimes been facilitated by the use of annular elements of a composition similar to that of the pipes which are to be joined. Such elements, which may be termed fusible back-up rings, are located against the inner surfaces of the pipe ends at their junction during the welding process and may have integral portions extending between these ends. Because these rings are in substantial contact with the interior pipe surfaces at the pipe ends, oxidation of the metal at the weld inside the pipe is partially or wholly precluded. During the application of heat such rings fuse either completely or partially with the pipe material and with any additional weld metal which may be provided. However, because the ring is not removed the resultant joint has a continuous obstruction projecting into the interior of the pipe which presents a constriction to the flow of fluids and causes turbulence and resultant loss in fluid energy. Furthermore, where corrosive liquids are carried by the pipe, local or crevice corrosion often results from the collection of sludge on the irregular surfaces provided by the unremoved ring.

In an effort to overcome the above disadvantages of the fusible back-up ring, the art has evolved collapsible backup rings which do not become a part of the weld and therefore can be removed from the interior of the joint after the weld is completed. Like the fusible back-up rings described, these collapsible back-up rings engage the interior surfaces of the ends of the abutting pipe sections substantially across the joint during the welding operation and thus prevent the formation of large interior beads or icicle formations. In addition these collapsible back-up rings also exclude from the area of the weld on the interior of the pipe all but a very small quantity of air which can result in oxidation.

In the past however, collapsible back-up rings have not enjoyed wide acceptance in the art. They have usually been difficult to dislodge from the joint after the welding operation and often it has been difficult to orient them properly with respect to the abutting pipe ends before welding. Also, difficulty has been experienced in assembling such collapsible rings, especially under the adverse conditions often encountered in the field.

Accordingly, it is one object of this invention to provide a collapsible back-up ring which is easily and quickly assembled preparatory to use.

It is another object of this invention to provide a collapsible back-up ring which is readily oriented with respect to the ends of the pipes to be welded, thus assuring proper alignment of the pipes and uniformity of the weld.

It is another object of this invention to provide a back-up ring which is readily removable from the interior of the pipe after the weld is completed.

It is another object of this invention to provide a collapsible back-up ring which includes a plurality of arcuately shaped segments wherein each segment is provided at one of its ends with a socket for receiving an end of the adjacent segment.

It is a further object of this invention to provide a collapsible back-up ring including a hub and a plurality of arcuately shaped segments which when assembled form a generally annular member around said hub, wherein each annular segment is adapted to be moved radially outwardly by arms on said hub which are releasably secured to said segments.

It is a further object of this invention to provide a collapsible back-up ring having a plurality of arcuately shaped segments which when fitted together define a substantially continuous annular member, wherein the segments are partially held together by removable exterior connecting members which serve to align the ring with respect to the pipe prior to the welding operation.

It is a further object of this invention to provide a collapsible back-up ring including a plurality of arcuately shaped segments which when assembled form a substantially continuous annular member and wherein the segments are secured to each other in a series arrangement by flexible rope-like elements, whereby when the ring is collapsed it may be readily drawn through the pipe.

These and other objects of the invention will become apparent from the following description:

In the drawings:

FIG. 1 is an end view of a collapsible back-up ring embodying this invention, the ring being assembled and ready for use;

FIG. 2 is an exploded view showing an arm of the hub and one manner of joining the piston rod of the arm to a segment of the back-up ring;

FIG. 3 is a view similar to FIG. 2, showing another manner of joining the piston rod to the segment;

Figure 4:
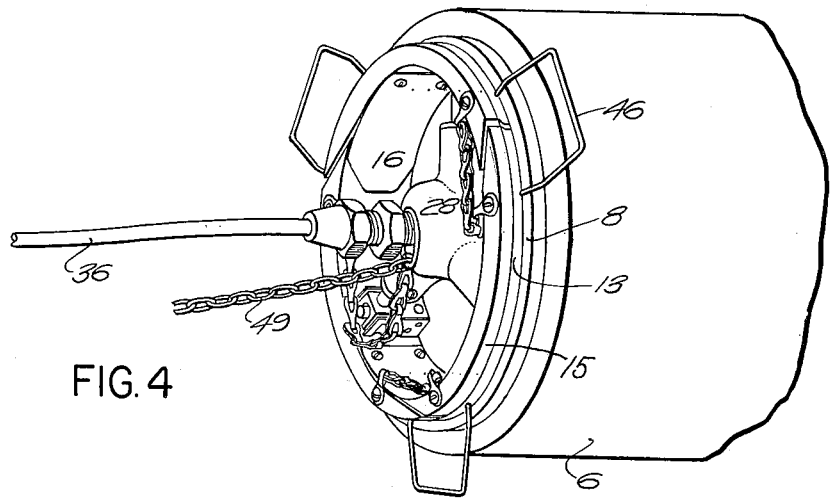
FIG. 4 is a perspective view of the back-up ring expanded within the end of a pipe.

Referring to the drawings, the numeral 10 indicates a collapsible annular element composed of a plurality of arcuate segments 12 whose ends slidably overlap one another. Thus, each segment is beveled at both ends and one end 14 is provided on its inner surface with a strip of metal 16 secured thereto by screws or rivets 17. This strip extends along the beveled end 14 to form a loose socket 18 for receiving the other beveled end 20 of the adjacent segment. The sockets 18 thus formed are open at their sides so that the segments may be readily assembled and disassembled by lateral sliding. With this arrangement the annular element 10 is able to expand and contract slightly as a unit.

Each segment is also provided on its inner surface with a bracket 24 secured thereto by bolts 25 and supporting a pin 26 extending parallel to the axis of the ring slightly inwardly of the inner segment surface. Sheet metal elements 27 are secured to the sides of each bracket 24 and extend along the pin 26 to function as spring clips for receiving a fork member 42.

A hub element 28 having a central fluid tight chamber 30 therein (see Fig. 2) is provided with a plurality of radially extending hollow arms 32 forming cylinders communicating with the chamber. A fitting 34 serves to connect a fluid conducting hose 36 to the hub chamber 30.

A piston 38 is slidably located in each of the radially extending cylinders and has a piston rod 40 extending therefrom and carrying the fork element 42. A spring 44 is interposed within each cylinder between a closure element 45 and the piston 38 normally maintains the pistons in a radially contracted position.

In assembling the back-up ring an end of each arcuate segment is fitted into the socket 18 of the adjacent segment and the hub element 28 is placed so that the ends of the forked elements 42 are frictionally held around the pin 26 by the action of the spring clips 27. The friction of the clips 27 aids in keeping the segments 12 together before use.

As another aid in keeping the segments 12 together and for an aligning purpose to be described later, each end of each segment is provided on the outer surface thereof with a radially inwardly extending hole 47. A generally U-shaped wire member 46 has its ends inserted in adjacent holes which are located approximately midway across the width of segments 12.

Rope-like links 48 formed of chain or other flexible material have their ends secured to adjoining segment ends and to the hub member 28 so that these segments and the hub member are connected in series by such links. Thus the hub member 28 is provided with a ring 52 to which is connected one end of a link 48, the other end of which is in turn connected to a first segment. This segment is in turn connected by another link to a second segment which is in turn connected to the third segment which forms the end of the series.

It will be understood that whereas in the arrangement shown in the drawings the series of elements comprises the hub followed by the segments, any order may be adopted for connecting the segments and the hub in series to achieve the desired result of easy removal of the device from the completed joint along the last pipe section. If the fluid conducting hose is utilized for withdrawing the collapsible back-up ring along this section, then it is preferred that the hub be the first in series. If, however, a separate chain such as shown at 49 is relied upon to withdraw the elements, then the hub may be located in a position other than first in the series.

Figure 5:
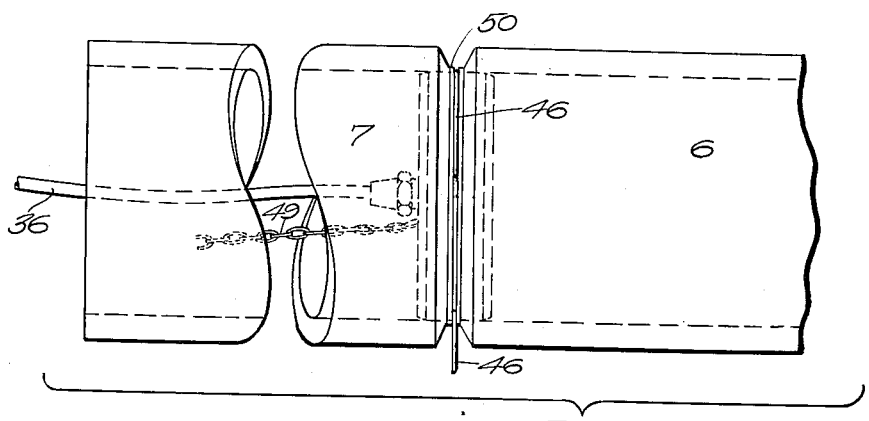
FIG. 5 is a side elevation view showing pipe ends aligned with the back-up ring expanded and in place prior to the welding operation.

The device is used as follows: With the segments assembled and the hub positioned as shown in FIG. 1, the device is placed within the end of a pipe section 6 (which is to be welded to another pipe section 7) until the wire members 46 abut the root 8, as shown in FIG. 4. The hose 36 is then passed through the other pipe section 7, and a fluid under pressure (usually air) is introduced into the hose 36. The fluid causes pistons 38 to move outwardly against the force of the springs 44 and the forked elements bear against the pins 26 to move the arcuate segments 12 radially outwardly into firm engagement with the interior of the end of pipe section 6. The pipe section 7 is next slipped over the exposed edges of the segments 12 until the wire members 46 abut its root 50. To facilitate the insertion of the end of pipe section 7 over the expanded back-up ring, the exterior surfaces of the segments 12 may be slightly chamfered at their edges as at 15. Because the wire members 46 are of uniform thickness, the two pipe ends are in alignment and their roots are spaced apart a distance equal to this thickness, as shown in FIG. 5. Next these wire members 46 are withdrawn and the pipe sections are pushed together until their roots are in contact with each other. The pipe ends are now ready for welding.

As seen in FIG. 4, each segment 12 is provided at its mid-portion with a slight depression 13 which is continuous and which after withdrawal of members 46, is in substantially the same plane as the abutting roots of the pipe ends. The depression 13 is provided to allow the formation of a slight convexity of the weld metal on the interior of the pipe, since it has been found that a slightly convex weld is less prone to failure than either a flat or slightly concave weld.

Figure 6:
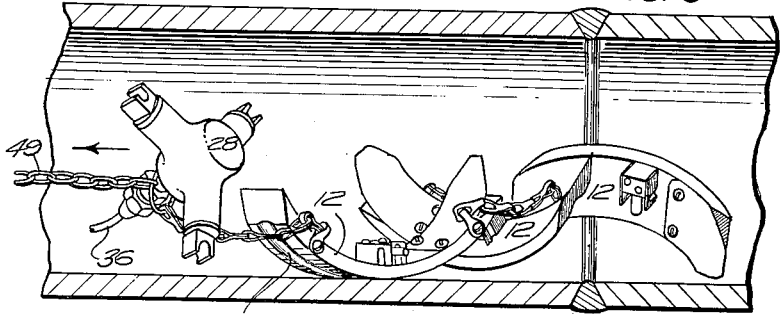
FIG. 6 is a cross-section view showing the back-up ring collapsed and being drawn through the pipes after the completion of the welding operation.

After the weld has been completed, the pressure in hose 36 is diminished until the forked elements 42 no longer bear tightly on the pins 26 and the springs 44 cause these elements to retract. The hose 36 or a chain 49 attached to the assembly is then pulled from the open end of the pipe section 7 until the forked elements 42 slide off the pins 26. As the hub is pulled through the pipe section, links 48 pull the first segment 12 in the series sidewise causing its ends to move out of the sockets 18 through their open sides. As the hub continues to be pulled out of the pipe, the remaining segments, linked by additional flexible elements 48, are separated and pulled along in a similar manner. This removal procedure, with the segments 12 collapsed, is shown in FIG. 6.

After withdrawal the segments are reassembled, the hub element is positioned therein, the clips 46 are reinserted and the device is again ready for use in welding the next pipe section.

In FIG. 3 of the drawings, a modification is illustrated wherein piston rod 40a is provided with a longitudinally extending keyway 41. The rod 40a is prevented from rotating by a key 43 secured to the closure element 45 and fitting into the keyway. By the use of the key and groove rotation of the rod 40a is prevented.

Also in FIG. 3 a modification is illustrated wherein the end of the rod 40a is provided with an element 42a having an aperture for receiving the pin 26, rather than a fork, as in FIG. 2. By the use of the apertured element 42a, the spring clips 27 are not needed to prevent outward radial movement of the segments 12 with respect to the piston rods while the unit is being handled preparatory to installation.

I claim:

1. A collapsible back-up ring for the welding of abutting pipe ends including: a plurality of arcuate segments each having a socket at one end loosely receiving the end of an adjacent segment, the segments forming a generally continuous annular member; spring clips mounted on the inner surfaces of the segments; a hub having a plurality of radially extending arms the outer ends of which are releasably retained by said spring clips, whereby movement of said hub along the axis of said annular member separates said hub from said member.

2. A collapsible back-up ring for the welding of abutting pipe ends including a plurality of arcuate segments each having a tapered socket at one end loosely receiving the complementary male end of an adjacent segment, the socket tapering smaller inwardly from the said end of each arcuate segment, each socket comprising radially spaced portions which provide an opening transverse to the plane of the ring, whereby the arcuate segments may move radially to expand the ring by virtue of their tapering socket connections and whereby the male ends of the arcuate segments may slide out of the said transverse openings at right angles to the plane of the ring to effect the ring's complete collapse when desired.

3. A collapsible back-up ring for the welding of abutting pipe ends including: a plurality of arcuate segments each having a socket at one end loosely receiving the opposite end of an adjacent segment, the segments forming a generally continuous annular member; a hub element having a plurality of radially extending arms, means for securing the outer ends of said arms to the segments, said means including a pin secured to each of the segments, said pin extending parallel to the longitudinal axis of the annular member, an apertured element at the outer end of each radially extending arm encircling said pin, and means associated with said hub for moving said arms radially outwardly to slightly expand said annular member.

4. A collapsible back-up ring for the welding of abutting pipe ends including: a plurality of arcuate segments each having a socket at one end loosely receiving the opposite end of an adjacent segment whereby the segments form a generally continuous annular member; a hub element having a plurality of radially extending arms, each arm having a slot extending longitudinally thereof, key means on said hub element cooperating with each of said longitudinal slots to prevent rotation of said arms and permit longitudinal movement of said arms with respect to said hub element, means mounted on said segments for securing the outer ends of said arms to the segments, and means associated with said hub for moving said arms radially outwardly to slightly expand said annular member.

5. A collapsible back-up ring for the welding of abutting pipe ends including: a plurality of arcuate segments each having a socket at one end loosely receiving the opposite end of an adjacent segment, the segments forming a generally continuous annular member; a hub element having a plurality of radially extending arms, means for securing the outer ends of said arms to the segments, said means including a pin on each segment which extends substantially parallel to the axis of the annular member and wherein the said outer ends of the hub arms are each provided with an element engaging said pin, said element being slidable along said pin in a direction parallel to said axis and out of engagement with said pin, whereby the hub arms may be separated from the pins to collapse the annular member, and means associated with said hub for moving said arms radially outwardly to slightly expand said annular member.

6. A collapsible back-up ring for the welding of abutting pipe ends including: a plurality of arcuate segments each having a socket at one end loosely receiving the opposite end of an adjacent segment, the segments forming a generally continuous annular member, a hub element having a plurality of radially extending arms, means mounted on said segments for securing the outer ends of said arms to the segments, means associated with said hub for moving said arms radially outwardly to slightly expand said annular member, and an element having one end slidably extending substantially radially into an opening in the exterior surface of a segment near one end thereof and having its other end slidably extending substantially radially into another opening in the exterior surface of the adjacent segment near the end adjacent the first segment, a portion of said element between said element ends spanning said segment ends in a plane substantially perpendicular to the axis of said annular member, whereby said element aligns the back-up ring with respect to pipe ends and also aids in keeping the arcuate segments in assembled relationship.

References Cited in the file of this patent

UNITED STATES PATENTS

| | | |
|---|---|---|
| 1,922,324 | Price et al. | Aug. 15, 1933 |
| 1,980,419 | Martin et al. | Nov. 13, 1934 |
| 2,226,078 | Spahn | Dec. 24, 1940 |
| 2,214,899 | Brown | Sept. 17, 1940 |
| 2,321,308 | Miller | June 8, 1943 |
| 2,429,053 | Forbes | Oct. 14, 1947 |
| 2,694,376 | Hauser | Nov. 16, 1954 |

FOREIGN PATENTS

| | | |
|---|---|---|
| 1,090,052 | France | Oct. 13, 1954 |